US008287124B2

United States Patent
Krall et al.

(10) Patent No.: US 8,287,124 B2
(45) Date of Patent: Oct. 16, 2012

(54) OPTHALMIC LENSES HAVING REDUCED BASE OUT PRISM

(75) Inventors: Jeffrey P. Krall, Mitchell, SD (US); Hugh McLoughlin, Dromara (GB); Trevor Steele, Randalstown (GB); Andrew Whale, Craigavon (GB)

(73) Assignee: Crossbows Optical Limited, Northern Ireland (IE)

( * ) Notice: Subject to any disclaimer, the term of this patent is extended or adjusted under 35 U.S.C. 154(b) by 0 days.

(21) Appl. No.: 13/214,615

(22) Filed: Aug. 22, 2011

(65) Prior Publication Data

US 2012/0019774 A1   Jan. 26, 2012

Related U.S. Application Data

(62) Division of application No. 12/383,400, filed on Mar. 24, 2009, now Pat. No. 8,042,940.

(51) Int. Cl.
  *G02C 7/14* (2006.01)
  *G02C 7/00* (2006.01)
  *G02C 7/02* (2006.01)
  *A61F 2/16* (2006.01)

(52) U.S. Cl. ............ 351/159.58; 351/159.45; 623/6.26

(58) Field of Classification Search ........... 351/159, 351/169, 170, 175, 159.01, 159.42, 159.45, 351/159.58
See application file for complete search history.

(56) References Cited

U.S. PATENT DOCUMENTS

| | | | |
|---|---|---|---|
| 3,245,745 A | 4/1966 | Hancock | |
| 4,056,311 A | 11/1977 | Winthrop | |
| 6,142,624 A | 11/2000 | Morris et al. | |
| 6,364,481 B1 | 4/2002 | O'Connor et al. | |
| 6,652,097 B2 | 11/2003 | Shirayanagi | |
| 6,776,486 B2 | 8/2004 | Steele et al. | |
| 6,871,954 B2 * | 3/2005 | Copeland | 351/163 |
| 6,956,682 B2 | 10/2005 | Wooley | |
| 7,104,647 B2 | 9/2006 | Krall | |
| 7,216,977 B2 | 5/2007 | Poulain et al. | |
| 7,828,439 B2 * | 11/2010 | Krall | 351/246 |
| 2006/0139571 A1 | 6/2006 | Poulain et al. | |
| 2006/0170863 A1 | 8/2006 | Krall | |
| 2008/0278676 A1 | 11/2008 | Croft et al. | |
| 2009/0290121 A1 | 11/2009 | Drobe et al. | |
| 2010/0066974 A1 | 3/2010 | Croft et al. | |

FOREIGN PATENT DOCUMENTS

| | | |
|---|---|---|
| FR | 2 814 819 | 4/2002 |
| WO | WO 2007/068819 | 6/2007 |

OTHER PUBLICATIONS

Teitelbaum, Pang and Krall, "Effectiveness of Base in Prism for Presbyopes with Convergence Insufficiency", Optometry and Vision Science, vol. 86, No. 2, Feb. 2009, pp. 153-156.

* cited by examiner

*Primary Examiner* — Jordan Schwartz
(74) *Attorney, Agent, or Firm* — Wood, Phillips, Katz, Clark & Mortimer

(57) ABSTRACT

The invention generally relates to a lens and the method of manufacturing progressive addition lenses (PAL) to remove unwanted base out prism and minimize excessive convergence, comprising determining basic configuration of two major lens surfaces to provide a distance portion and near portion, wherein diopter power increases from the distance portion of the lens to the near portion; selecting an amount of prism reduction; and reducing base out prism that inherently occurs as diopter power increases by altering the configuration of the lens as a function of the amount of prism reduction to minimize any disruption of optical properties a lens while decreasing base out prism.

12 Claims, 4 Drawing Sheets

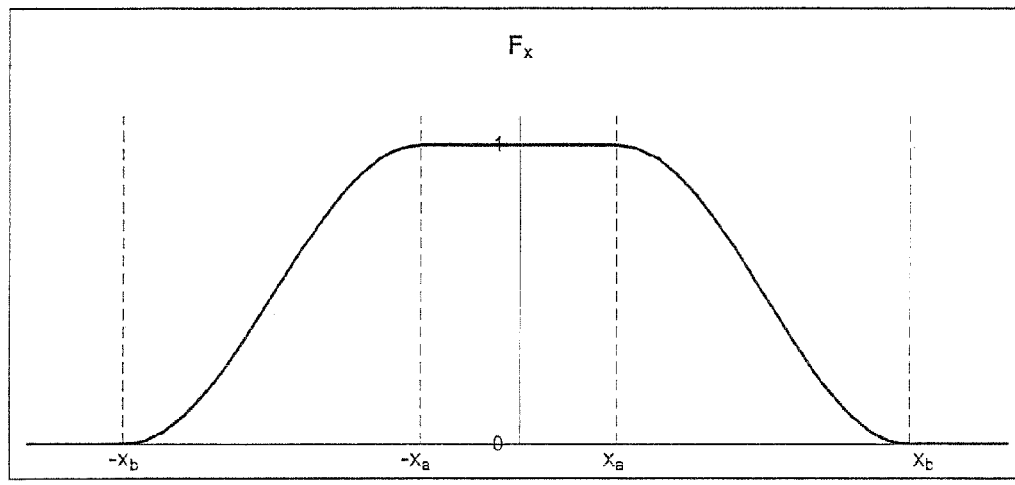
FIG. 3
FIG 4
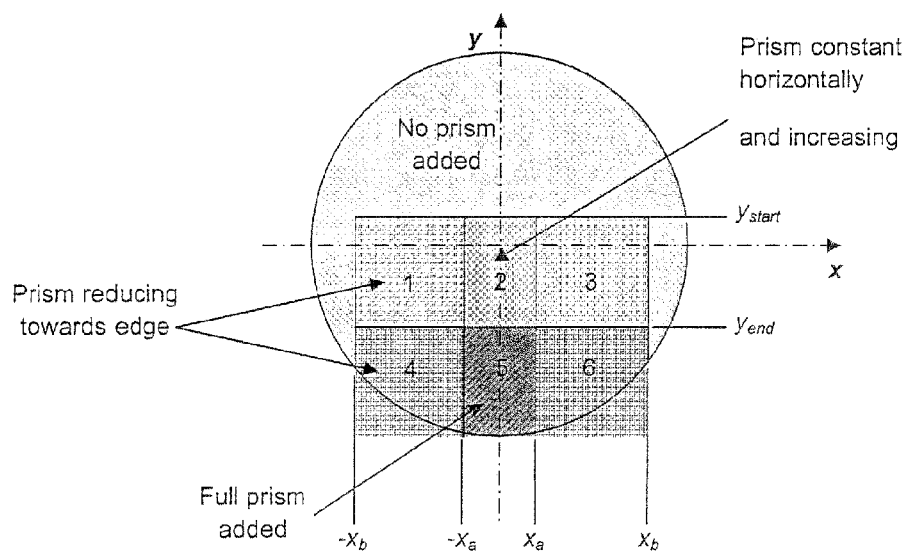

OPTHALMIC LENSES HAVING REDUCED BASE OUT PRISM

CROSS REFERENCE TO RELATED APPLICATIONS

This application is a divisional of application Ser. No. 12/383,400 filed Mar. 24, 2009 now U.S. Pat. No. 8,042,940.

FIELD OF THE INVENTION

This invention relates to ophthalmic lenses. In particular this invention is directed to reducing unwanted base out prism by changing the lens surface to cause minimal disruption to other optical properties of the lens.

BACKGROUND OF THE INVENTION

With normal vision, an individual is able to change focus for different distances. Ideally, an individual is able to focus on distant objects, referred to as distance vision, and on near objects, referred to as near vision. The optical system of the eye uses numerous muscles to focus for both distance and near vision. These muscles allow the eye to adjust focus when transitioning between distance vision and near vision. There are various responses involved in changing focus from distance vision to near vision. These include making the image clearer, the eyes turning in or out, and pupils changing size. If the eyes do not turn in enough with near vision, for example, then the individual would see double.

Single vision lenses have been used for many years to correct farsightedness, nearsightedness, and astigmatism (ametropia). When we look directly through the optical center of a single vision lens there is no prismatic effect induced in any direction. As your eyes move away from the optical center of a lens (correcting ametropia) prism results and increases as you move farther from the optical center. This prism is mostly induced by the curvature difference in the two major lens surfaces and is the result of moving away from the optical center. The amount of prism changes with both power and distance from the optical center. The stronger the lens and the farther from the optical center the more prism is induced. For someone that is farsighted wearing a lens to correct hyperopia, converging to a near object causes the eyes to look towards the nasal side of the optical center of the lenses. In this instance base out prism would be induced when looking at near therefore causing an increase in the convergence demand necessary to view the object under binocular conditions. This increased convergence can be a source of asthenopia.

Bifocals, including progressive addition lenses (PALs), have been used for many years to help with presbyopia. PALs provide the ability for a person wearing these type of lenses to see at different distances. PALs or Bifocals are generally needed when the eye can no longer make the total change in focus necessary from distance to near. PALs typically provide a distance portion in the lens (this would include the patient's prescription to see clearly at a distance) and a smooth graduating continuous change in dioptric power to a near power (this would be the diopter add power for the patient to see clearly at near). PALs have no lines or edges visible between changes in dioptric power. PALs are available for example in different add powers, corridor lengths and corridor widths depending on the need.

Prior art PALS thus traditionally include undesired base out prism that is induced at near when the optical surface of the lens is altered to create the add power at near.

SUMMARY OF THE INVENTION

This invention relates to reducing unwanted base out prism by changing a lens to cause minimal disruption to other optical properties of the lens. There is disclosed in accordance with one aspect of the invention an improvement in a progressive addition lens (PAL) comprising a distance portion and a near portion, wherein dioptric power increases from the distance portion of the lens to the near portion. The improvement consists of a lens being formed to reduce base out prism that inherently occurs as the add power increases. The lens is altered to minimize any disruption of optical properties of the lens while decreasing the base out prism.

It is a feature of the invention that the lens comprises two major surfaces, each major surface being defined by a set of Cartesian coordinate points. The points are selected to alter the prism properties of selected zones of the lens.

It is another feature that at least one of the major surfaces is altered to modify tilt applied to the one major surface at each point by applying a weighting factor. The weighting factor may gradually increase traversing from the distance portion to the near portion. Also, the weighting factor may gradually increase and then decrease traversing from one side of the lens to the other. The weighting factor may vary between 0 and 1. The weighting factor may vary according to a select desired prism change to be added to the undesired base output prism.

There is disclosed in accordance with another aspect of the invention an improvement in an ophthalmic lens consisting of a lens being formed to reduce increasing base out prism that inherently occurs when the eyes are viewing an object under binocular conditions away from an optical center of the lens. The lens is altered to minimize any disruption of optical properties of the lens while decreasing base out prism.

There is disclosed in accordance with another aspect of the invention the method of manufacturing progressive addition lenses (PAL) to remove unwanted base out prism which minimizes excessive convergence needed when viewing objects within the intermediate and reading portions of the lens, comprising the steps of: determining the basic configuration of two major lens surfaces to provide a distance portion and near portion, wherein dioptric power increases from the distance portion of the lens to the near portion; selecting an amount of prism reduction; and reducing base out prism that inherently occurs as diopter power increases by altering the configuration of at least one of the major lens surfaces as a function of the amount of prism reduction to minimize any disruption of optical properties of a lens while decreasing base out prism.

Further features and advantages of the invention will be readily apparent from the specification and from the drawings.

BRIEF DESCRIPTION OF THE DRAWINGS

FIG. 3 is a curve illustrating a weighting factor applied to a tilt angle relative to an X axis for the lens of FIG. 1;

FIG. 4 is a diagram of a lens showing areas of relative reduced base out prism in accordance with the invention.

DETAILED DESCRIPTION OF THE INVENTION

This invention relates to single vision, and multifocal ophthalmic lenses. In particular this invention is directed to progressive addition lenses (PALs) in which under the current art base out (Bo) prism is generally increasing from the distance portion of the lens to the near portion of the lens, this not accounting for the patients ametropia. It is common that negligible or no base out prism is induced at the optical center/prism reference point, and as much as one diopter of unwanted base out prism is present at the reading or near portion of the lens. This occurs as changes take place to produce the reading addition power. This invention reduces this unwanted base out prism by changing the major lens surfaces, either on the front surface, back surface, or internally within the lens, in such a way as to cause minimal disruption to other important optical properties of the lens.

Figure 1:
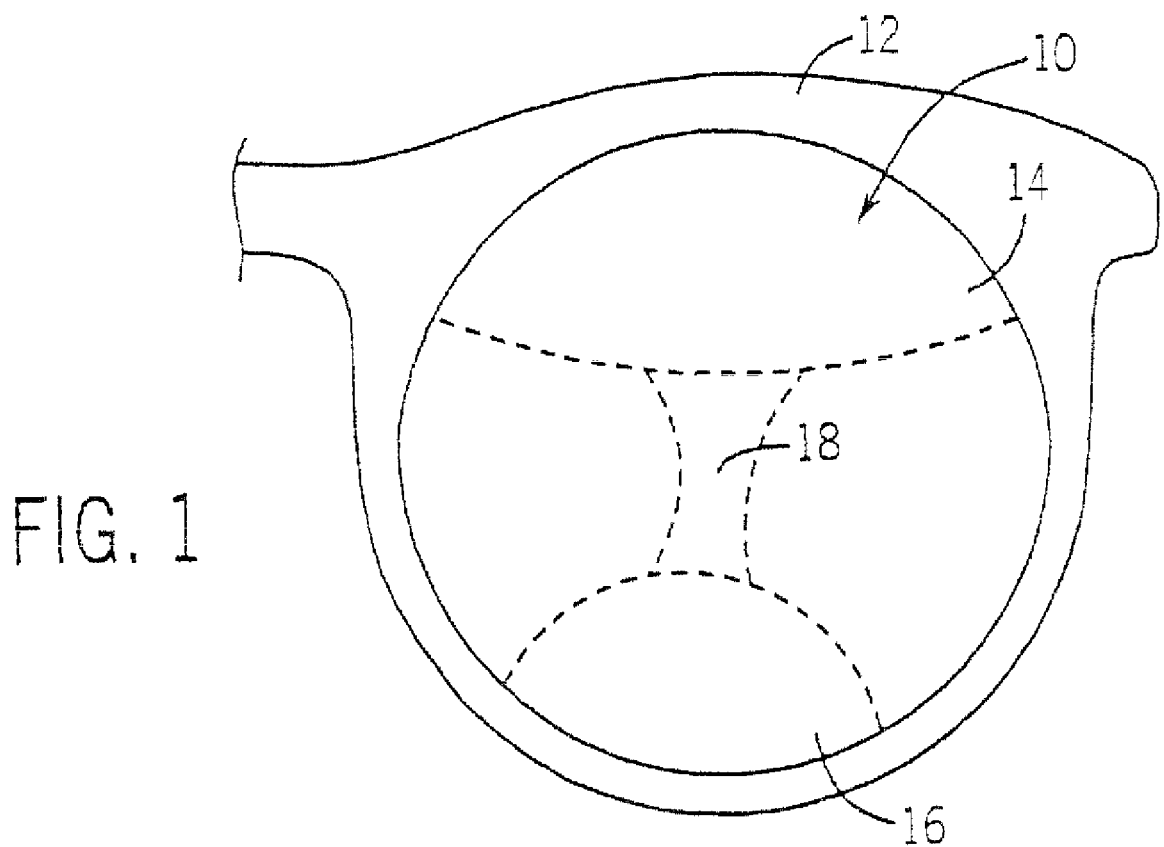
FIG. 1 is a partial, front elevation view of eyeglasses including a multifocal ophthalmic lens in the form of a progressive addition lens in accordance with the invention.

A progressive addition lens is one lens that has at least one progressive addition surface which could be placed on either or both sides of the lens or within the lens itself. Referring to FIG. 1, a progressive additional lens 10 is illustrated in a frame 12. The lens 10 is illustrated with dashed lines to separate different portions of the lens 10. Particularly, a distance portion 14 is separated from a near portion 16 by an intermediate portion 18. The different portions are defined by a progressive surface which is an aspheric surface in which the distance portion 14 and near portion 16 are connected by a smooth and continuous changing increasing dioptric power in the intermediate portion 18 from the distance portion 14 to the near portion 16. A distance vision correction amount, expressed in diopters, is used in the distance portion 14. "Add power" is the amount of dioptric power difference added to the distance correction in the near portion 16. The present invention reduces unwanted induced prism commonly found in single vision lenses and progressive multifocal lenses (PALs) and traditional bifocal lens when the eyes are viewing object under binocular conditions away from the optical center of the lens. When an individual changes gaze from a distance object to near object the eyes converge to the point being viewed. Some lenses and particularly progressive lenses exhibit base out prism as the patients' eyes begin to look at the object away from the optical center of the lens. Previous multifocal and single vision lenses have not addressed the change in convergence necessary to maintain binocularity that occurs when the eyes translate into a portion of a single vision lens away from the optical center and into the reading area of a multifocal lens. In particular if the patient's correction is negated with the current art of making progressive multifocal lens base out prism is increasing from the distance portion of the lens to the reading portion of the lens. This base out prism requires additional convergence of the human eyes in order to maintain convergence on the object in which they are viewing. This increase in convergence can create asthenopia for the individual.

This invention of ophthalmic lenses defines a lens design and method for removing the unwanted base out prism which increases the convergence demand on the visual system when viewing an object at near (which generally is away from the distance optical center of the lens). This reduction in base out prism allows the viewer to have reduced need to converge when looking through the portion of the lens that is outside the optical center. In particular this invention helps reduce the unwanted base out prism when viewing object through the add portion of a PAL lens. Traditionally, prism is placed into the entire lens therefore not varying the amount of prismatic effect as the eye is moving away from the optical center of the lens. Also traditionally increasing or decreasing amounts of prism are not intentionally induced in the lens to add to or take out the prism that is induced because of the lens design.

It is the discovery of this invention that the continuous change in add power of progressive addition lenses (PAL) from the distance zone to the near zone while controlling any unwanted base out prism reduces the need for the eyes to converge more than normal at near. This therefore reduces eye strain. The lens is altered in such a way to reduce the horizontal base out prismatic effect and causing minimal disruption to other important optical properties of the lens. This reduction of base out prism is not a by-product of the resultant nature of progressive lenses but a desired outcome and design of the lens.

It is also a discovery of this invention that when a single vision lenses is used to correct ametropia that prism is induced when looking away from the optical center of the lens. This prism will vary depending upon the power of the correction and the distance from the optical center. Reduction of this induced prism can be counteracted by altering the lens in order to reduce any unwanted change in prism when looking away from the optical center. The amount of prism induced will be increased as the resultant nature of the prism increases the further you get from the optical center of the lens.

One method in accordance with the invention comprises manufacturing progressive addition lenses (PALs) to remove unwanted base out prism and minimize excessive convergence. This comprises: determining the basic configuration of the two major lens surfaces to provide a distance portion and near portion, wherein dioptric power increases from the distance portion of the lens to the near portion; selecting an amount of prism reduction; and reducing base out prism that inherently occurs as dioptric power increases by altering the configuration of at least one of the major lens surfaces as a function of the amount of prism reduction to minimize any disruption of optical properties a lens while decreasing base out prism. Each major surface is defined by a set of x,y,z Cartesian coordinate points, as is known. In accordance with the invention, the points are selected to alter the prism properties of selected zones of the lens.

One exemplary method of achieving this result is to apply a function $z = F(x, y)$ at each point. This function modifies the tilt applied to the surface to achieve the desired prism by applying two weighting functions and $F_x$ and $F_y$. The weighting functions modify the angle of tilt in a controlled manner in order to disturb the surface as little as possible and keep unwanted distortion to a minimum. These functions $F_x$ and $F_y$ both vary between 0 and 1 and modify the angle of tilt by simple multiplication. The function $F(x, y)$ would be applied at the point $(x_i, y_i)$ as follows:

$$F(x_i, y_i) = z_i + x_i \tan(\theta \times F_y \times F_x)$$

where $z_i$ is the original height of the point at $(x_i, y_i)$ and $F(x_i, y_i)$ is the modified height to give the desired prism.

The angle of tilt $\theta$ required to give the desired prism is given by $$\theta = \frac{\tan^{-1}\left[\frac{P}{100}\right]}{(n-1)}$$

where: P=desired prism change to be applied in prism dioptres. P can be selected based on design considerations and patient trials. n=refractive index of lens material and $F_x$ and $F_y$ are two weighting functions used to modify the angle of tilt by simple multiplication and are determined as follows:

$F_y$ is given by:

$$y_i > y_{start} \qquad F_y = 0$$

$$y_{start} \geq y_i \geq y_{end}: \quad F_y = 0.5\left\{\cos\left[\frac{(y_i - y_{end})\pi}{(y_{end} - y_{start})}\right] + 1\right\}$$

$$y_i < y_{end}: \qquad F_y = 1$$

Figure 2:
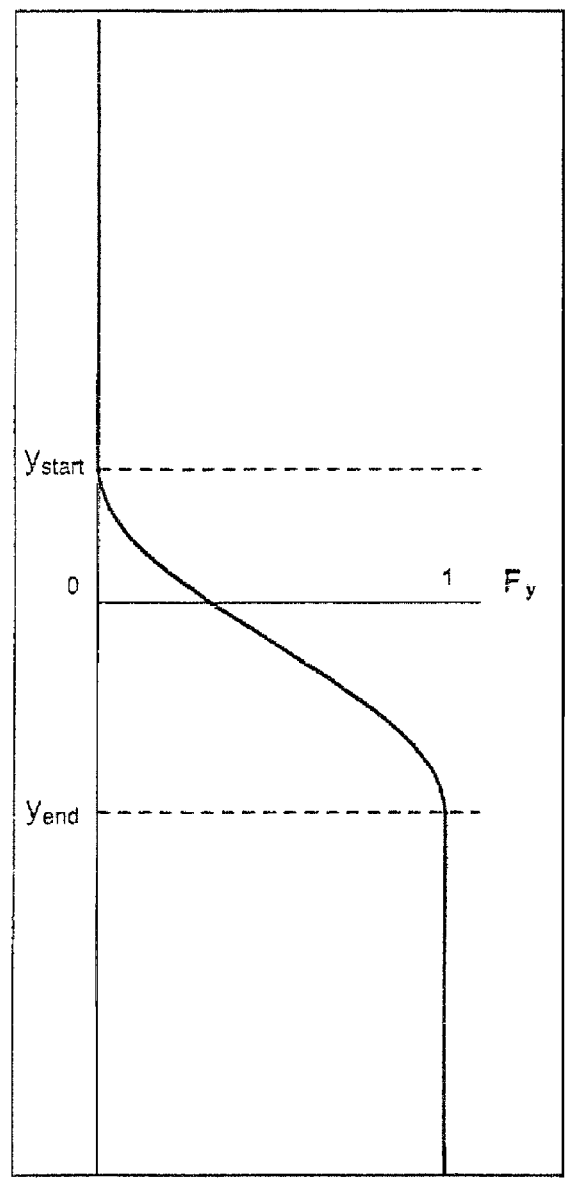
FIG. 2 is a curve illustrating a weighting factor applied to a tilt angle relative to a Y axis for the lens of FIG. 1.

FIG. 2 shows how this weighting function $F_y$ changes from the top of the lens to the bottom of the lens.

$F_x$ is given by:

$$x_i < -x_b: \qquad F_x = 0$$

$$-x_b \leq x_i \leq -x_a: \quad F_x = 0.5\left\{\cos\left[\frac{(x_i + x_a)\pi}{(x_b - x_a)}\right] + 1\right\}$$

$$-x_a \leq x_i \leq x_a: \quad F_x = 1$$

$$x_a \leq x_i \leq x_b: \quad F_x = 0.5\left\{\cos\left[\frac{(x_i - x_a)\pi}{(x_b - x_a)}\right] + 1\right\}$$

$$x_i > x_b: \qquad F_x = 0$$

FIG. 3 shows how this weighting function $F_x$ changes from one side of the lens to the other side of the lens.

FIG. 4 shows the co-ordinate system used relative to a lens in accordance with the invention. The y axis is vertical (top to bottom on the lens) and the x axis is horizontal (side to side on the lens). The z axis (not shown in the drawing) is perpendicular to the plane formed by the x and y axes. FIG. 4 also shows exemplary areas on the lens surface which are affected by $F_x$ and $F_y$. The intersection of the x and y axes is the optical center of the lens. In this illustration, no prism is added in most of the upper portion of the lens. Particularly, no prism is added in the area above the line labeled $y_{start}$ or outside the areas hounded by lines $-x_b$ to $x_b$. Otherwise, the illustrations show six generally rectangular areas. As will be apparent, the areas on the lens are not rectangular, but this is used to divide the lens into areas for general characterization purposes herein. Area 2 which includes the optical center has constant prism added in a horizontal direction the value of which increases vertically from top to bottom. Area 5 has the full amount of prism added. Areas 1, 3, 4 and 6 have the amount of added prism reduced going toward the edges from the y axis. This should be apparent by considering the weighting factor graphs of FIGS. 2 and 3 relative to the corresponding points on the diagram moving vertically on the y axis or horizontally on the x axis.

Figure 5:
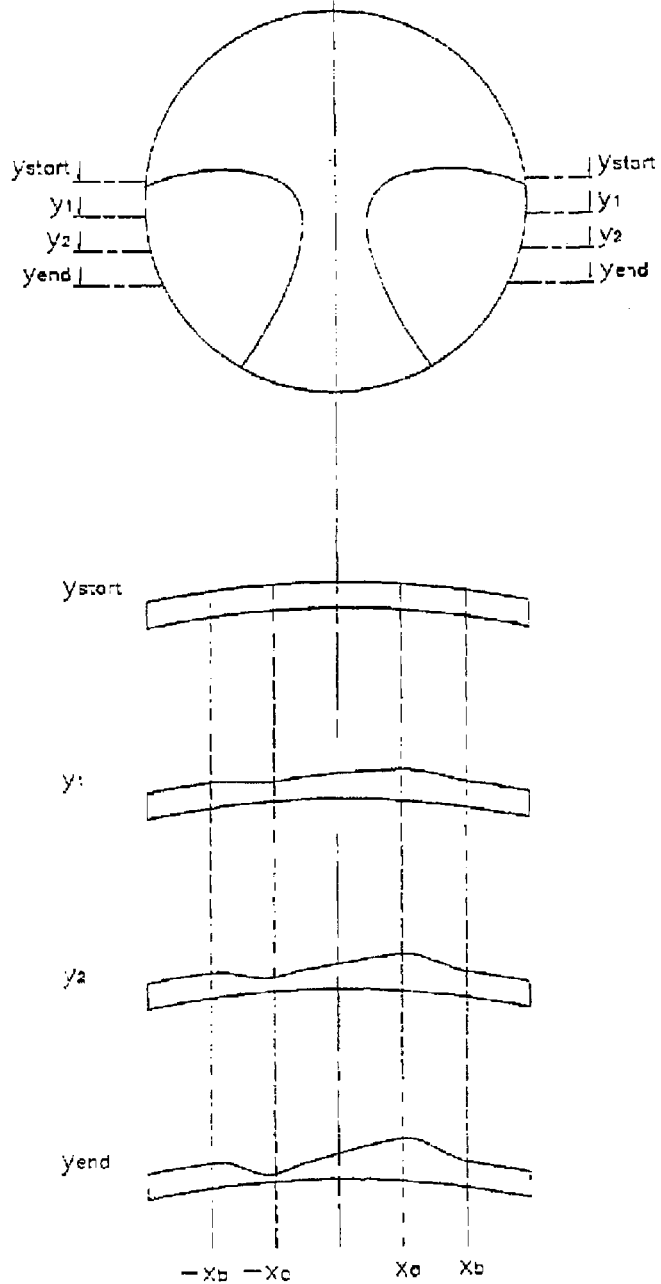
FIG. 5 illustrates a lens and cross sections showing modification in the surface of the lens of FIG. 1 in accordance with the invention.

FIG. 5 shows the physical effects (exaggerated) on the lens surface at four different positions. Particularly, the cross section for $y_{start}$ illustrates that no changes have been made, while traversing through the subsequently lower cross section tilt angles are altered to reduce increasing base out prism while minimizing any disruption of optical properties. As will be apparent, on the actual lens surfaces, the surface modifications area done gradually and the illustration exaggerates the effect for purposes of illustration and understanding.

The $y_{start}$ and $y_{end}$ positions correspond with those shown in FIGS. 2 and 4. $y_1$ and $y_2$ are two intermediate positions. At the $y_{start}$ position, the original surface has not been affected. $y_1$ and $y_2$ positions show the prism effect increasing in accordance with $F_y$. At the $y_{end}$ position the maximum prism effect of $F_x$ and $F_y$ has been achieved. In this example, this prism effect is then maintained at this constant value to the bottom of the lens.

$-x_b$, $-x_a$, $x_a$ and $x_b$ also correspond with those shown in FIGS. 3 and 4. In this example the nasal side of the lens is on the right and it can be seen that constant Base-in prism has been achieved between $-x_a$ and $x_a$. Between $-x_b$ and $-x_a$, and between $x_a$ and $x_b$ smooth blending of the surface is achieved in accordance with $F_x$.

As is known, when an individual looks from the distance portion of the lens to the near portion the eye does not transcend vertically but at an angle down and in. This is referred to as the eye path or corridor path. A progressive addition lens is typically fitted at distance a few millimeters above the prism reference point of the lens. The connecting line between this point and the near reference point would be considered to be the eye path or the corridor path. While this application discusses reduction of base out prism relative to an axis transcending vertically and what happens to the lens in a horizontal and vertical dimension, the correction may in fact be applied relative to the corridor path, as will be apparent to one skilled in the art.

The lenses in accordance with the invention may be fabricated by any conventional methods and all known materials suitable for production of ophthalmic lenses. Such materials can include all glass, polycarbonate, polymethylmethacrylate, and other high index materials. Further, the lenses may be produced by any suitable techniques including but not limited to grinding, casting, laminating, surface casting, thermoforming, or a combination thereof.

While the present invention is specifically described with respect to a multifocal ocular lens in the form of progressive addition lenses, the concepts of the invention can be applied to non-progressive lenses, such as bifocals or trifocals, or to single vision lenses.

Thus, in accordance with the invention, there is provided a multifocal ocular lens in which inherent base out prism due to the increase in power between the distance and near portions is removed.

The invention claimed is:

1. In an ophthalmic lens, the improvement consisting of the lens being formed to reduce base out prism that inherently occurs when the eyes are viewing an object under binocular conditions away from an optical center of the lens, the lens being altered to minimize any disruption of optical properties of the lens while decreasing the base out prism, wherein the lens comprises two major surfaces, each major surface being defined by a set of Cartesian coordinate points, the points being selected to alter the prism properties of selected zones of the lens.

2. The improvement of claim 1 wherein tilt applied at each point to at least one of the major surfaces is modified by applying a weighting factor.

3. The improvement of claim 2 wherein the weighting factor gradually increases traversing from a distance portion to a near portion.

4. The improvement of claim 2 wherein the weighting factor gradually increases to a maximum value of 1 and then, decreases as the lens is traversed from one side of the lens to the other in the x direction over a predetermined area in the y direction.

5. The improvement of claim 2 wherein the weighting factor varies between 0 and 1.

6. The improvement of claim 2 wherein the weighting factor varies according to a select desired prism change to be added to undesired base out prism.

7. Eyeglasses comprising:
a frame; and
an ophthalmic lens in the frame consisting of the lens being formed to reduce increasing base out prism that inherently occurs when the eyes are viewing an object under binocular conditions away from an optical center of the lens, the lens being altered to minimize any disruption of optical properties of the lens while decreasing the base out prism, wherein the lens comprises two major surfaces, each major surface being defined by a set of Cartesian coordinate points, the points being selected to alter the prism properties of selected zones of the lens.

8. The eyeglasses of claim 7 wherein tilt applied at each point to at least one of the major surfaces is modified by applying a weighting factor.

9. The eyeglasses of claim 8 wherein the weighting factor gradually increases traversing from a distance portion to a near portion.

10. The eyeglasses of claim 8 wherein the weighting factor gradually increases to a maximum value of 1 and then decreases as the lens is traversed from one side of the lens to the other in the x direction over a predetermined area in the y direction.

11. The eyeglasses of claim 8 wherein the weighting factor varies between 0 and 1.

12. The eyeglasses of claim 8 wherein the weighting factor varies according to a select desired prism change to be added to undesired base out prism.

* * * * *